United States Patent [19]

Caën

[11] Patent Number: 5,128,604

[45] Date of Patent: Jul. 7, 1992

[54] TWO PHASE POWER CONTROL OF A THREE-PHASE LOAD CIRCUIT

[76] Inventor: Claude Caën, 1 rue Louis Pasteur, 92100 Boulogne-sur-Seine, France

[21] Appl. No.: 521,888

[22] Filed: Apr. 10, 1990

[30] Foreign Application Priority Data

Apr. 21, 1989 [FR] France .................. 89 05315

[51] Int. Cl.⁵ .................................... G05B 24/02
[52] U.S. Cl. .......................... 323/319; 323/207; 323/235; 323/910
[58] Field of Search .............. 323/235, 236, 319, 910, 323/207, 217

[56] References Cited

U.S. PATENT DOCUMENTS

| | | | |
|---|---|---|---|
| 3,497,796 | 2/1970 | Konrad | 323/910 |
| 3,696,288 | 10/1972 | Carman | 323/910 |
| 3,764,890 | 10/1973 | Caen | 323/319 |
| 3,904,952 | 9/1975 | Evalds | 323/235 |
| 4,101,819 | 7/1978 | Maeda et al. | 323/910 |
| 4,117,349 | 9/1978 | Ott | 323/910 |
| 4,167,696 | 9/1979 | Gyursanszky | 323/319 |
| 4,449,091 | 5/1984 | Otoi | 323/910 |
| 4,618,817 | 10/1986 | Holtslander | 323/319 |
| 4,645,997 | 2/1987 | Whited | 323/235 |
| 4,683,413 | 7/1987 | Bax | 323/910 |

FOREIGN PATENT DOCUMENTS 2089138 1/1972 France .
2122022 8/1972 France .

OTHER PUBLICATIONS

Hood, "Proposed Integrated Circuit for Appliance or Process Control", IEEE Transactions on Industry and General Applications, Oct. 1968, pp. 520-526, vol. IGA-4, No. 5.

Roublot, "Un circuit intégré pour la commande de thyristors et triacs", Electronique Industrielle, Apr. 1970, pp. 227-231.

*Primary Examiner*—J. L. Sterrett
*Attorney, Agent, or Firm*—Oblon, Spivak, McClelland, Maier & Neustadt

[57] ABSTRACT

A three-phase transformer is supplied by a three-phase AC line voltage. Two phases are connected via switches comprising head-to-tail connected thyristors. The third phase is connected directly to the transformer. The switches are of the zero voltage switching type. Under steady state conditions, the start of each series of cycles is obtained by closing in a fixed order a first switch at a time near the zero-crossing of the voltage across it (alternating between series of cycles the sign of the derivative of the voltage across it immediately before it is closed) and then the second switch approximately 90° after the first switch. The duration of a series of cycles if 570° plus a null or integer number of periods of the AC line voltage. This is achieved by counting thyristor firing command signals from pulse transformers driven by monostables.

4 Claims, 2 Drawing Sheets

TWO PHASE POWER CONTROL OF A THREE-PHASE LOAD CIRCUIT

BACKGROUND OF THE INVENTION

FIELD OF THE INVENTION

The present invention concerns a method of operating thyristor type switches to provide zero voltage switching power supply to a three-phase power circuit, in particular a circuit in which the power is transmitted through a transformer, the method being remarkable in that it combines the highest possible performance (complete cycles with no steep fronts and no short cycles) with an economical power circuit comprising only two switches each connected to a respective phase, the third phase being connected direct to the load circuit.

Over the last two decades zero voltage switching of thyristors has found increasing application in the control of heating in industrial processes such as the manufacture and treatment of glass. The power is varied by modulating the duty cycle, that is to say by varying the duration of the series of cycles relative to the times between series of cycles.

Zero voltage switching control of thyristors has two advantages over the conventional "phase adjustment" technique:

1) Steep fronts on the voltage and current waveforms are eliminated from the AC line voltage and from the load circuit.

2) The power factor is improved.

Steep fronts on voltage and current waveforms generate interference and are likely to disrupt the operation on other electronic circuits, both analog and digital, supplied by the same AC line voltage. Also, it is imperative to maintain the power factor at a value approximating unity when the power concerned is not negligible in comparison with the total power absorbed. Unlike phase control, zero voltage switching does not introduce any phase shift between current and voltage and also makes it possible to equalize the overall power absorbed by multiple heating channels.

The presence of an electromagnetic transformer as an intermediary element in the transmission of the power delivered by the thyristor switches connected to the primary and the load circuit connected to the secondary means that the method of operating the thyristors must conform to the magnetic saturation limits of the transformer, because of the transient conditions associated with the start and end of the series of cycles. This results either in increased complexity of the equipment or reduced performance and zero voltage switching methods for supplying power three-phase circuits through transformers are currently of two kinds:

1) High-performance methods of the kind described in published French patent application No. 2 122 022.

In these methods the potential performance capabilities of zero voltage switching are fully exploited. The voltage and current waveforms are free of any steep fronts and the duration of the working cycles is minimal with the result that fluctuations in the power delivered to either side of its mean value are minimal whether for a single heating channel or multiple heating channels, enabling optimum equalization of the overall power. On the other hand, these methods use three switches, one for each phase, and are therefore less economic.

2) Methods which use only two switches for the three phases, of the kind described in published French patent application No. 2 089 138. These methods are economic but offer poorer performance because they introduce steep voltage and current fronts at the start of each series of cycles and because they can operate only with long working cycles in order to provide periods between two series of cycles to allow sufficient magnetic relaxation of the transformer.

An object of the present invention is to propose a method which represents a synthesis of the previous methods, integrating the high performance of the former method with the latter type of device comprising only two switches.

SUMMARY OF THE INVENTION

The present invention consists in a method of operating alternating current switches to provide zero voltage switching power supply to a three-phase circuit using two switches each connected in series with a respective phase, the third phase being connected direct to the load circuit, in which method, under steady state conditions, the start of each series of cycles is obtained by closing in a fixed order a first switch at a time near the zero-crossing of the voltage across it, alternating between series of cycles the sign of the derivative of the voltage across it immediately before it is closed, and then the second switch approximately 90° after the first switch at a time near the zero-crossing of the voltage across it, and in which method the duration of a series of cycles is equal to a minimal duration defined by the conduction for approximately 570° of each switch increased by a null or integer number of periods of the AC line voltage.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
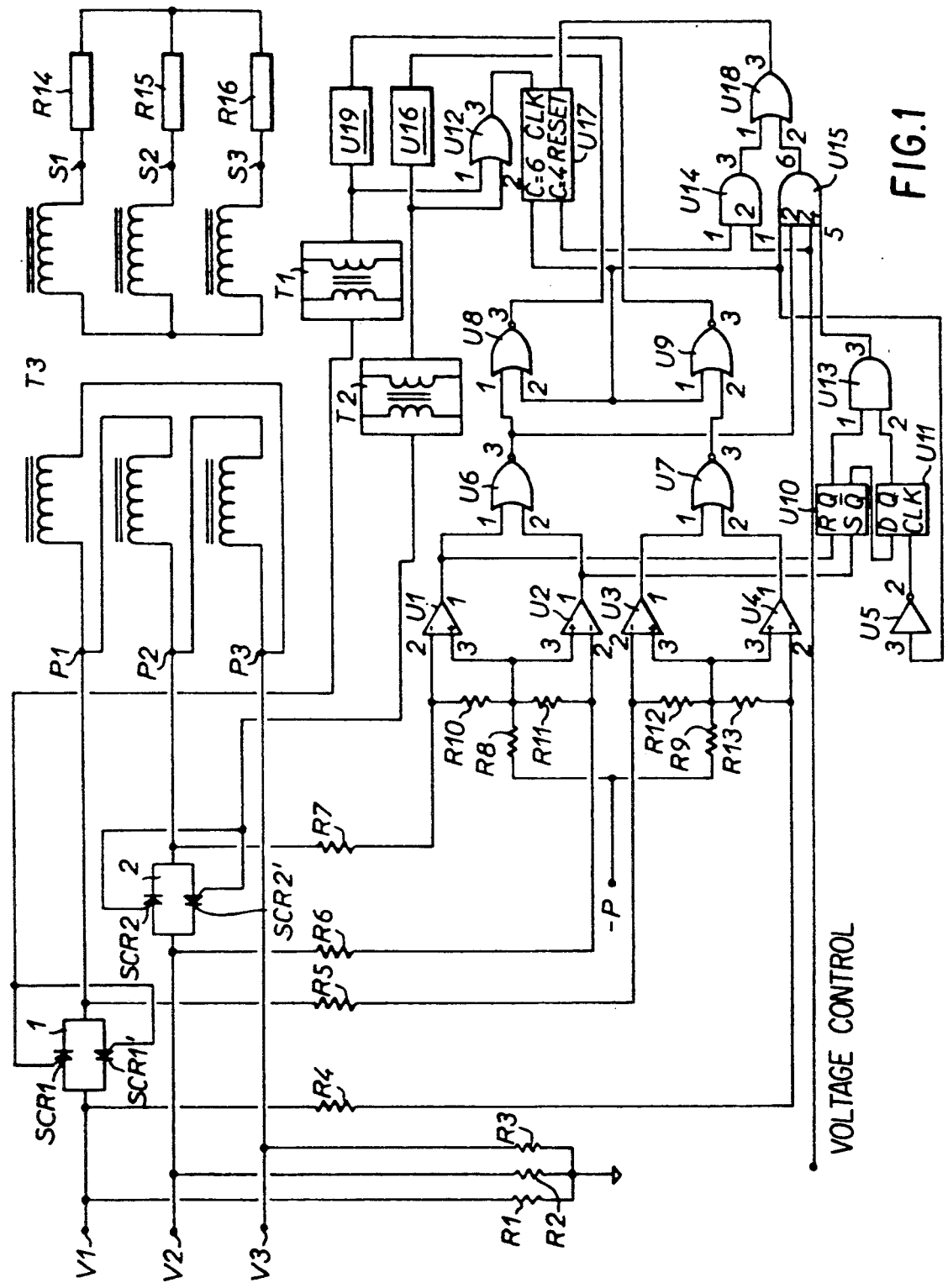
FIG. 1 is a schematic circuit implementing the method of the present invention.
Figures 2, 3:
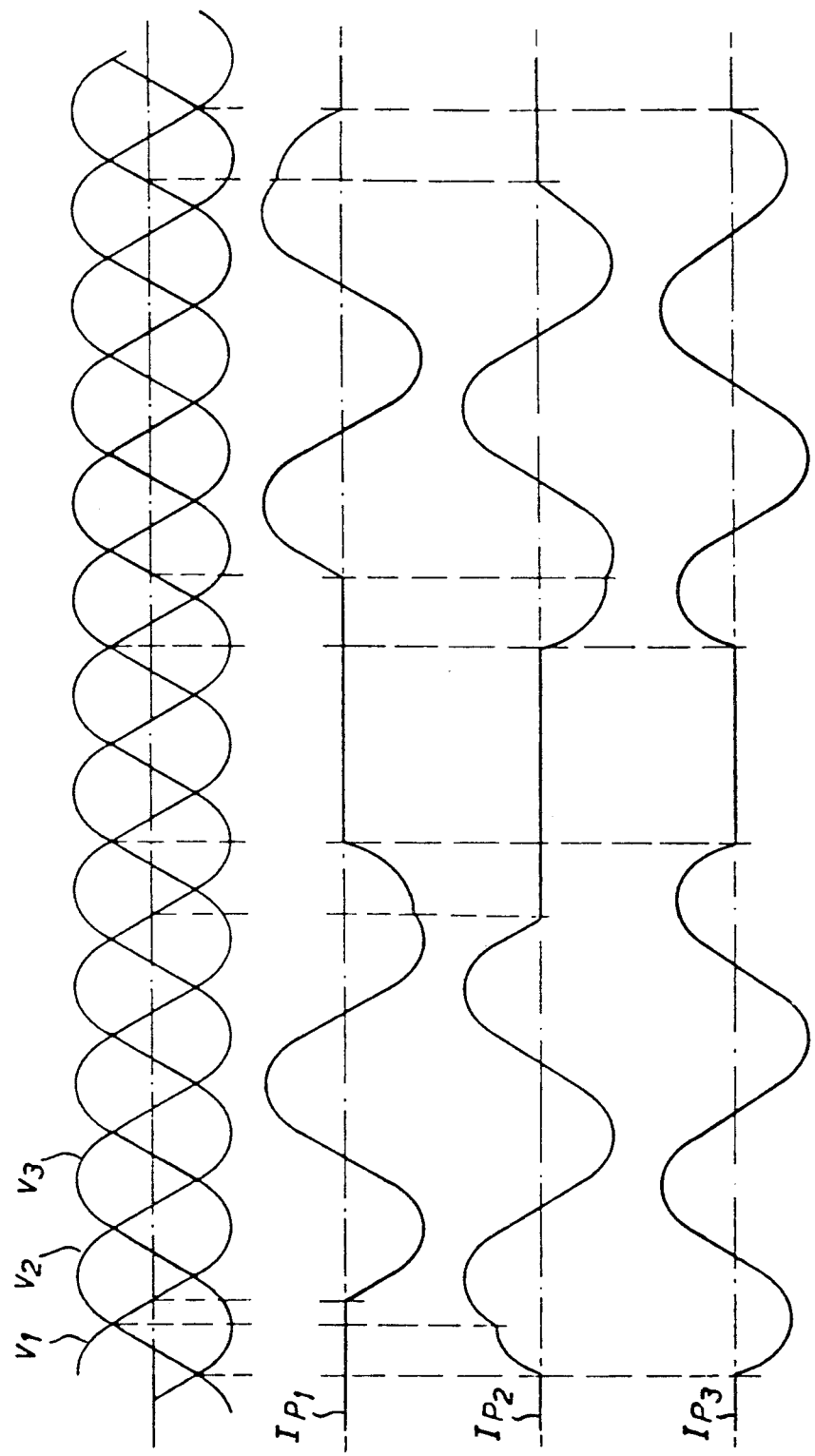
FIG. 2 is a graph of the variations of the three-phase AC line voltage of FIG. 1.
FIG. 3 is a graph of the variations of the currents at each of the terminals P1, P2 and P3.

The circuit includes a three-phase transformer T3 the primary of which has three windings connected in a delta arrangement between the terminals P1, P2, P3. The star secondary with three terminals S1, S2, S3 supplies three resistors R14, R15, R16 representing an active load.

The primary terminals P1, P2, P3 are connected to the conductors of a three-phase AC line voltage V1, V2, V3; P3 is connected direct to V3 while P1 and P2 are respectively connected to V1 and V2 through two switches I1 and I2. The AC line voltage V1, V2, V3 has a locally grounded artificial neutral formed by three resistors R1, R2 and R3 respectively connected between V1, V2 and V3 and ground.

Each of the switches I1 and I2 comprises a respective pair of thyristors SCR1, SCR1' and SCR2, SCR2' connected head-to-tail. The triggers of the thyristors are driven at the appropriate phase by the output of respective pulse transformers T1 and T2. The pulse transformers are commanded by monostables U16 and U19 at the output of a control logic circuit which comprises:

Two pairs of comparators U1, U2 and U3, U4.
Two sets of NOR gates U6, U8 and U7, U9.
Two AND gates U14, U15 and an OR gate U18.
A counter U17 and an associated OR gate U12.
An inverter U5, a flip-flop U10, a bistable U11 and an AND gate U13.

The connections between the various components of the control logic circuit will be specified in the description of how it operates. When a thyristor of each switch I1 and I2 is turned on (I1 and I2 closed) the full voltage is applied to the load circuit through T3. When all the thyristors are turned off (I1 and I2 open) there is no voltage at the load circuit terminals.

The presence of voltage at the load circuit terminals is commanded by an external "voltage control" binary signal applied to an input of the AND logic gates U14 and U15. The mean value of this binary signal is approximately representative of the working rate of the zero voltage switching system.

Under steady state conditions, meaning in particular after the transformer has reached a stable magnetic state, the control process proceeds as follows:

When the "voltage control" signal goes from the low logic state to the high state and thereby commands the start of a series of cycles the AND gate U13 goes to the high state and authorizes the commanding of I2 only if the sign of the voltage at the terminals of I2 as read at the Q output of the flip-flop U10 is coincident with the inverted voltage at the terminals of I2 immediately before the start of the preceding series of cycles, as memorized at the Q output of the bistable U11.

The comparators U1 and U2 connected to the terminals of I2 through resistor divider bridges R6–R11 and R7–R10 supply at their output logic signals, generally complementary to each other, representative of the sign of the voltage at the terminals of I2.

Within a narrow range around the null voltage they deliver the same low logic level because of the low-value bias voltage $-P$ applied to their positive input through the resistor R8 and referenced to the neutral of the three-phase voltages V1, V2, V3 defined by the three resistors R1, R2 and R3.

At the first zero-crossing of the voltage at the terminals of I2 after the output of U13 goes to the high state the two low logic levels applied to the input of the NOR gate U6 produce a high logic level at its output. This signal is applied to the inputs of the gate U15 and U8. The four inputs of the AND gate U15 are high, the fourth being connected to the C6 output of the counter U17 which has been high since the end of the preceding series of cycles. U15 transmits a high state to the OR gate U18 which resets the counter U17 so that its C6 output goes to the low state. This signal, transmitted by the inverter U5, creates a positive front at the clock input of the flip-flop U11 which memorizes the complement of the immediately preceding sign of the voltage at the terminals of I2, transmitted by the $\bar{Q}$ output of the flip-flop U10, for use at the start of the next series of cycles. Immediately the voltage at the terminals of I2 rises above a threshold set by $-P$ and which is assumed to be negligible in comparison with the amplitude of the supply voltages V1, V2, V3, the comparator U1 or U2 with the appropriate polarity has a high state at its output, producing a low state at the output of U6. Having a low state on each input, the NOR gate U8 transmits a high state to the input of the monostable U16 which causes the pulse transformer T2 to turn on the appropriate polarity thyristor SCR2 or SCR2' and close I2. The counter U17 is advanced one step by the action of the pulse generated by U16 and transmitted by the OR gate U12. At the zero-crossing of the voltage at the terminals of the switch I1 immediately following that of I2, because of the circuit comprising the resistor divider bridges R4, R13 and R5, R12, the resistor R9, the comparators U3, U4, the NOR gate U7, the NOR gate U9, the monostable U19 and the pulse transformer T1 operation is similar to that described above for the turning on of I2, leading to the turning on of I1 and to the incrementing of the counter U17 by a second step. At the zero-crossing of the current in I2 and then in I1, respectively 210° and 180° (electrical) before they are turned on, I2 and then I1 are turned off for a very short time to allow the voltage at their terminals to reach the threshold defined by $-P$ and so cause a high logic state at the output of one of the NOR gates U6 or U7 and, as previously, a command pulse to the thyristors of the switch I2 or I1 which is again turned on following an interruption whose duration is assumed to be negligible, by the same token as the amplitude of the threshold defined by $-P$. Each I2 or I1 command pulse advances the counter U17 by one step. When I2 and I1 have each received two command pulses the C4 output of the counter U17 goes to the high state. If the "voltage control" signal has returned to the low state the series of cycles terminates after the sixth command pulse when the C6 output of the counter U17 goes to the high state and disables the NOR gates U8 and U9, preventing the transmission of any further command instructions to I2 or I1.

The series of cycles obtained in this way has a duration equal to the minimal duration, corresponding to the conduction of I1 and I2 for 570° (electrical). The command process starts gain after the "voltage control" signal returns to the high state, in the same way as before. On the other hand, if the "voltage control" signal is still high when the C4 output of the counter U17 goes to the high state the output of the AND gate U14 goes to the high state and, by means of the OR gate U18, resets the counter U17.

The effect of this is to increase the duration of the series of cycles by four command pulses, that is one period of the AC line voltage. This increase in duration by an integer number of AC line voltage periods is repeated until the "voltage control" signal is low when the C4 output of U17 is high. The series of cycles terminates after two further command pulses when the C6 output of the counter goes high, in exactly the same way as in the case of a minimal duration series of cycles, as described above. The start of the next series of cycles is determined by the control signal returning to the high state, by means of the process as already described.

I claim:

1. Method for controlling power supply to a three-phase load circuit from a three-phase wire AC line by zero voltage switching using two switches, each connected in series with a corresponding phase wire, the third phase being connected direct to a corresponding pole of the load circuit, under steady state conditions, said switches being alternately closed for an operative series of cycles of voltage of said AC line, said method comprising the steps of:

closing one of the switches at a time near a zero crossing of voltage across the one switch, to start an operative series of voltage cycles;

said zero crossing of the voltage across the one switch being selected to occur so that the sign of the derivative of said voltage across the one switch, immediately before the closing of said one switch, alternates from one series of cycles to a following series of cycles;

closing the other of the switches approximately 90° after the closing of the one switch, and at a time near a zero crossing of voltage across the other switch;

allowing said two switches to open, for ending the outstanding operative series of cycles when the duration of said outstanding series of cycles is equal to a minimal duration of ¾ period of the AC line voltage, increased by a whole number, including zero, of periods of said AC line voltage.

2. Method according to claim 1, further comprising closing the switches in an order which is opposite to the order to which the succession of phases to which they are respectively connected.

3. Method according to claim 1, further comprising transmitting the series of cycles from the switches to the load circuit through a phase transformer having primary windings connected in a delta configuration.

4. Method according to claim 3, further comprising arranging the primary winding of the transformer on a central leg of a magnetic circuit of the transformer.

* * * * *